US007455580B2

(12) United States Patent
Cheng

(10) Patent No.: US 7,455,580 B2
(45) Date of Patent: Nov. 25, 2008

(54) DRY SPRAY DEVICE

(75) Inventor: Chieh-Yuan Cheng, Taichung (TW)

(73) Assignee: San Ford Machinery Co., Ltd., Taichung (TW)

( * ) Notice: Subject to any disclaimer, the term of this patent is extended or adjusted under 35 U.S.C. 154(b) by 826 days.

(21) Appl. No.: 10/995,437

(22) Filed: Nov. 24, 2004

(65) Prior Publication Data

US 2006/0107897 A1 May 25, 2006

(51) Int. Cl.
*B05B 15/12* (2006.01)
*B01D 50/00* (2006.01)
*B01B 50/00* (2006.01)

(52) U.S. Cl. ........................................ 454/50; 55/385.2

(58) Field of Classification Search ................... 454/50, 454/53, 63; 55/385.2; 118/602, 713
See application file for complete search history.

(56) References Cited

U.S. PATENT DOCUMENTS 4,278,243 A * 7/1981 Alessio ........................ 269/16
5,626,569 A * 5/1997 Holtermann et al. ........ 604/333
5,915,960 A * 6/1999 Check et al. ................ 432/222
2002/0043056 A1* 4/2002 Cheng ....................... 55/385.1

* cited by examiner

*Primary Examiner*—Steve McAllister
*Assistant Examiner*—Helena Kosanovic
(74) *Attorney, Agent, or Firm*—Ming Chow; Sinorica, LLC

(57) ABSTRACT

A dry spray device includes a base, an air-extracting device, a wind force indicator, a first filter, a second filter, an isolating device and a work frame. The isolating device has a spray space for placing a work to be sprayed with paint, and waste gas and paint odor produced during spraying in the spray space in the isolating device is sucked into an interior space in the base by a motor driving a rotary fan in a wind housing fixed on the base to be filtered by the first filter and then through the second filter to become clean air to be exhausted out into open air. As the second filter is arranged in a V-shape in the interior space of the base so that the base can be made compact to let the whole size of the device occupy only a small space.

5 Claims, 5 Drawing Sheets

DRY SPRAY DEVICE

BACKGROUND OF THE INVENTION

1. Field of the Invention

This invention relates to a dry spray device, particularly to one capable to suck and filter waste gas and paint odor produced during spraying paint into clean air so that the environment may not be polluted and workers' health may be protected, in addition to that it has a compact size not taking much space.

2. Description of the Prior Art

Nowadays, DIY is very popular, and people are fond of moving their own hands to make or combine things, repair something so as to acquire pleasure and satisfaction in the work, and spraying is one of DIY items commonly seen.

SUMMARY OF THE INVENTION

The dry spray device in the invention includes a base, an air-extracting device, a wind indicating device, a first filter, a second filter, an isolating device and a work frame. There is a spraying space surrounded by the isolating device and a work to be sprayed with paint placed on a worktable of the work frame, and waste gas produced by spraying and paint odor can be sucked through the first and the second filter positioned in the base and becoming clean air, which is exhausted out into open air.

Thus waste gas produced in spraying and paint odor can be cleaned by the dry spray device in the invention, not polluting the environment and not impairing workers' health, by utilizing the first and the second filter, and with the V-shaped arrangement of the second filter, and air extracting device just located on the second filter for making the size of the base compact, taking not much space.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
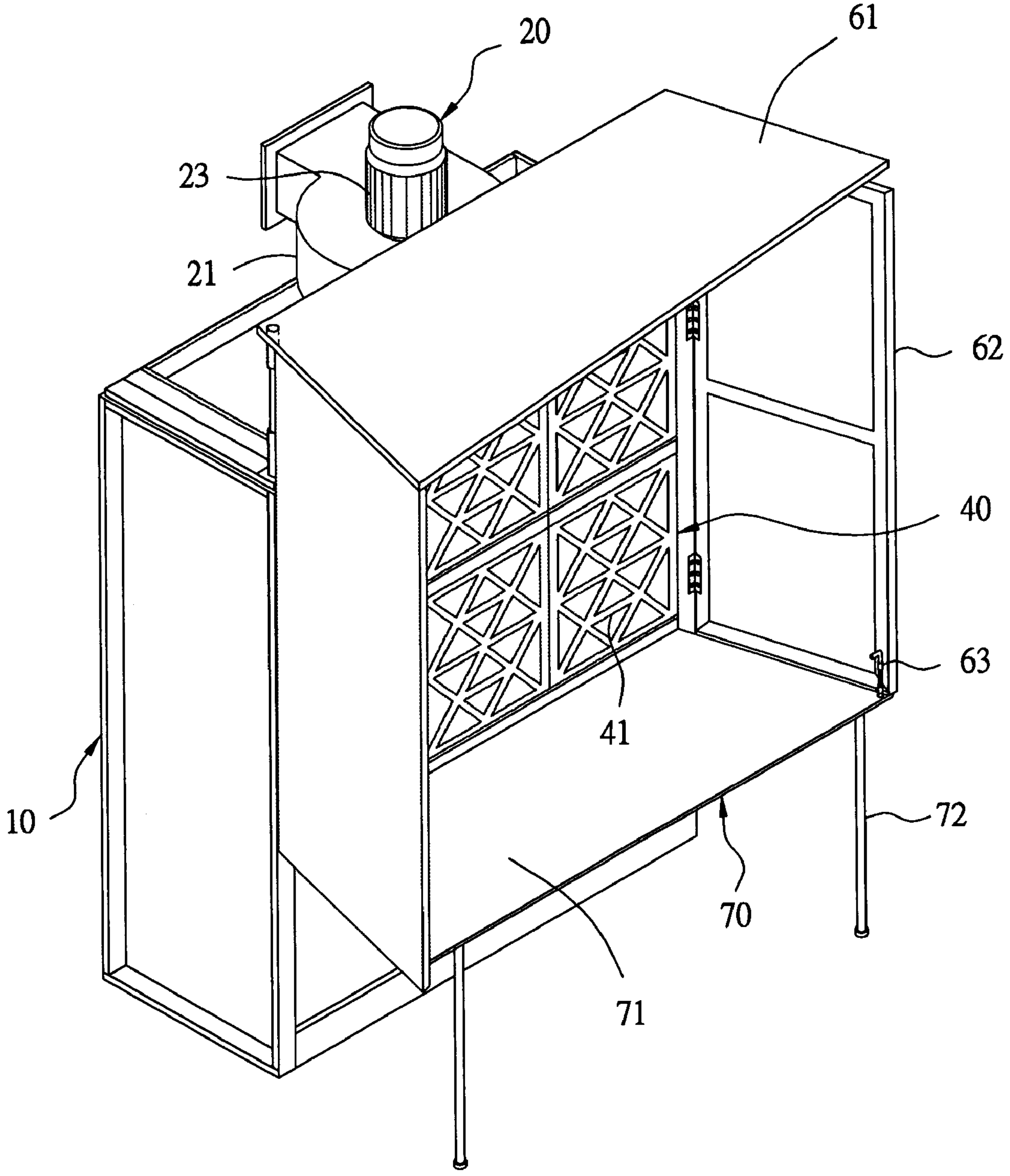
FIG. 1 is a perspective view of a dry spray device in the present invention.
Figure 2:
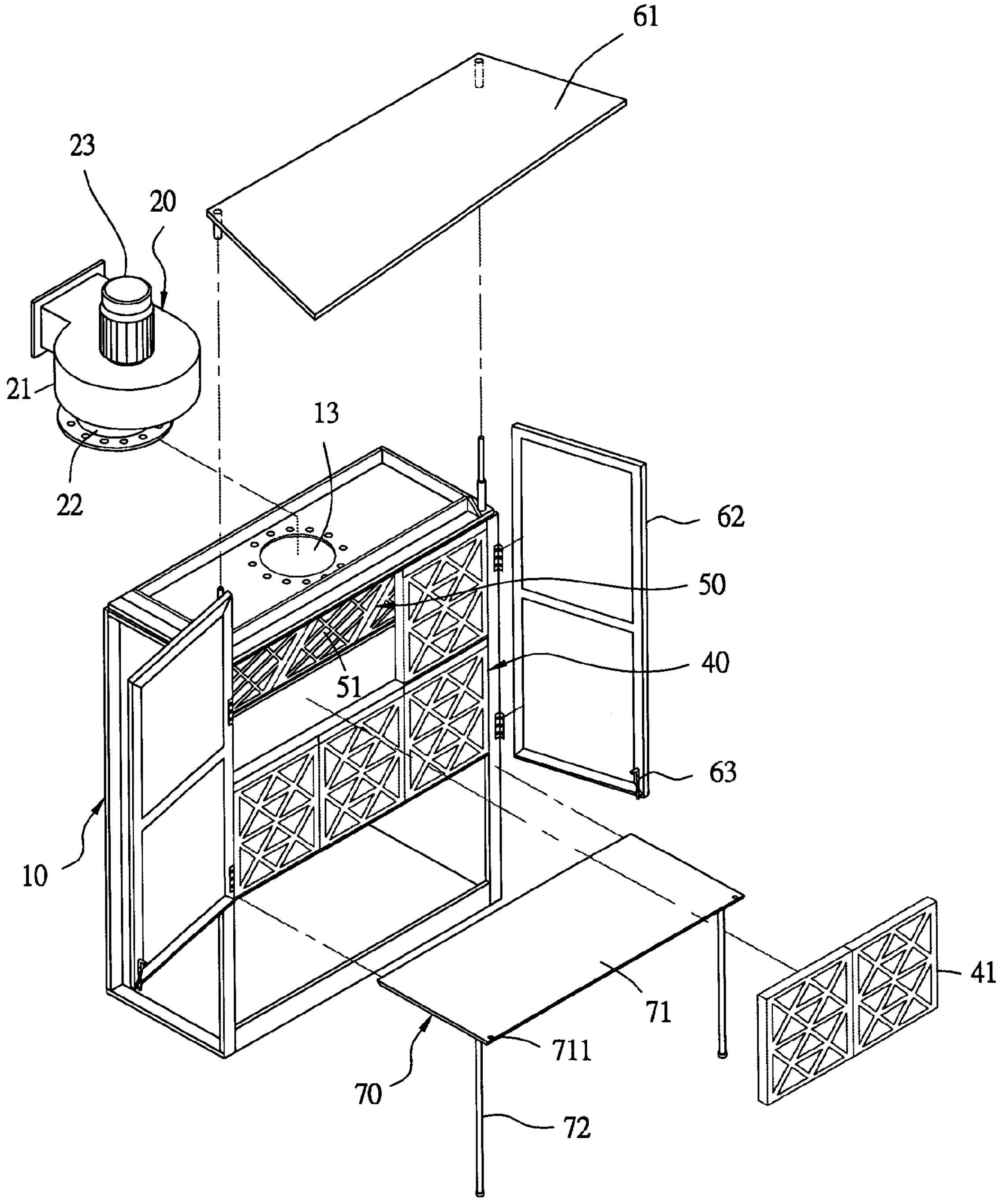
FIG. 2 is a partial cross-sectional view of the dry spray device in the present invention.
Figure 3:
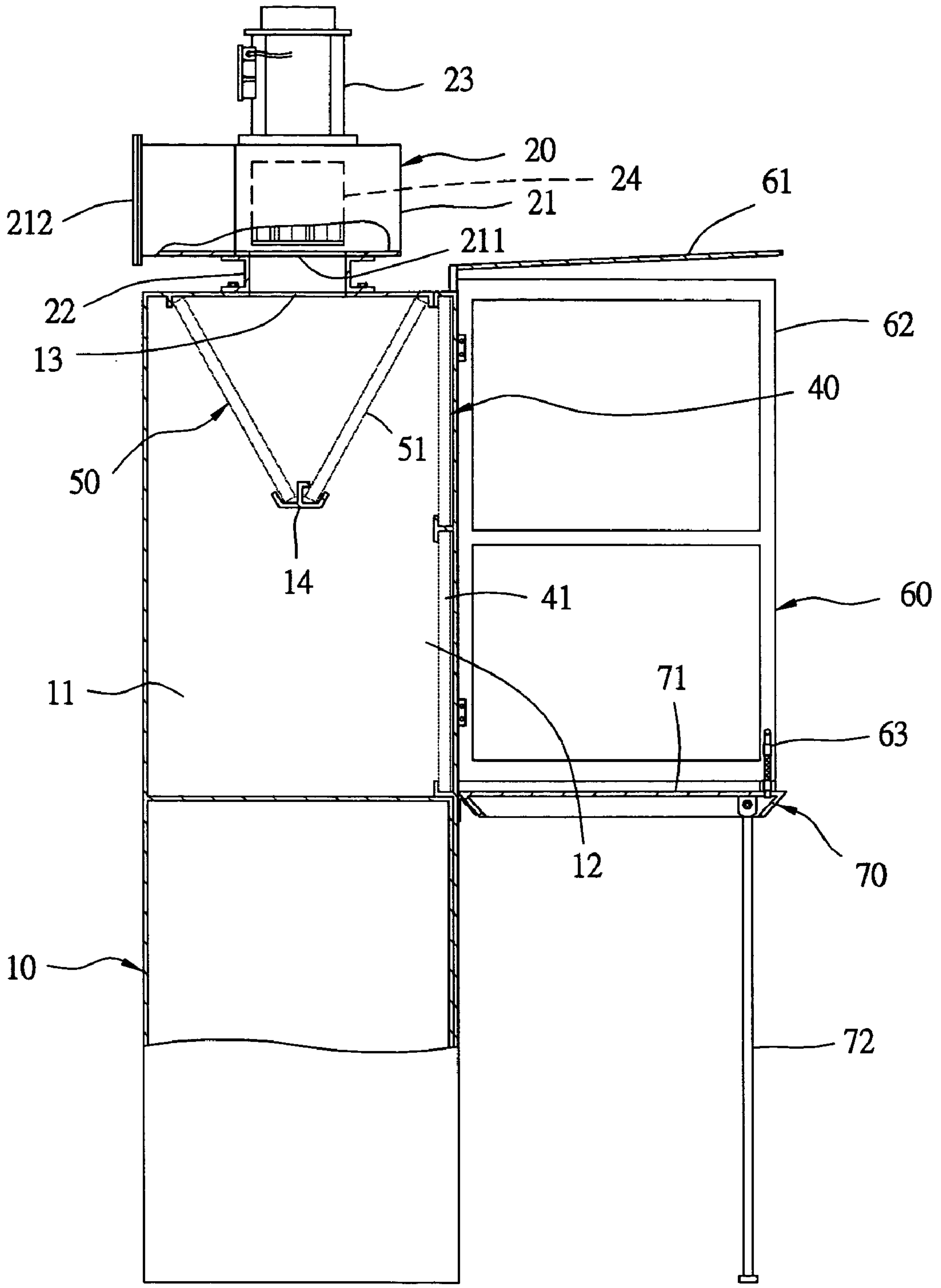
FIG. 3 is a side cross-sectional view of the dry spray device in the present invention.

A preferred embodiment of a dry spray device in the present invention, as shown in FIGS. 1, 2 and 3, includes a base 10, an air extracting device 20, a wind indicating device 30, a first filter 40, a second filter 50, an isolating device, and a work frame 70 as main components.

The base 10 has an interior space 11, an inlet 12 formed in the front side, an outlet 13 formed in an upper side, and a sustain bar 14 positioned laterally between two sidewalls in the upper portion of the interior space 11 just below the outlet 13.

The air-extracting device 20 is installed in a wind housing 21 positioned on the base 10, and the wind housing has a sucking hole 211 in the bottom wall, an exhausting hole 212 in a rear side. The sucking hole 211 is connected with an outlet 13 of the base 10 with a connect tube 22. Further, a motor 23 is fixed on the upper surface of the wind housing 21, and a rotary fan 24 is provided in the wind housing 21 to be rotated by the motor 23.

Figure 4:
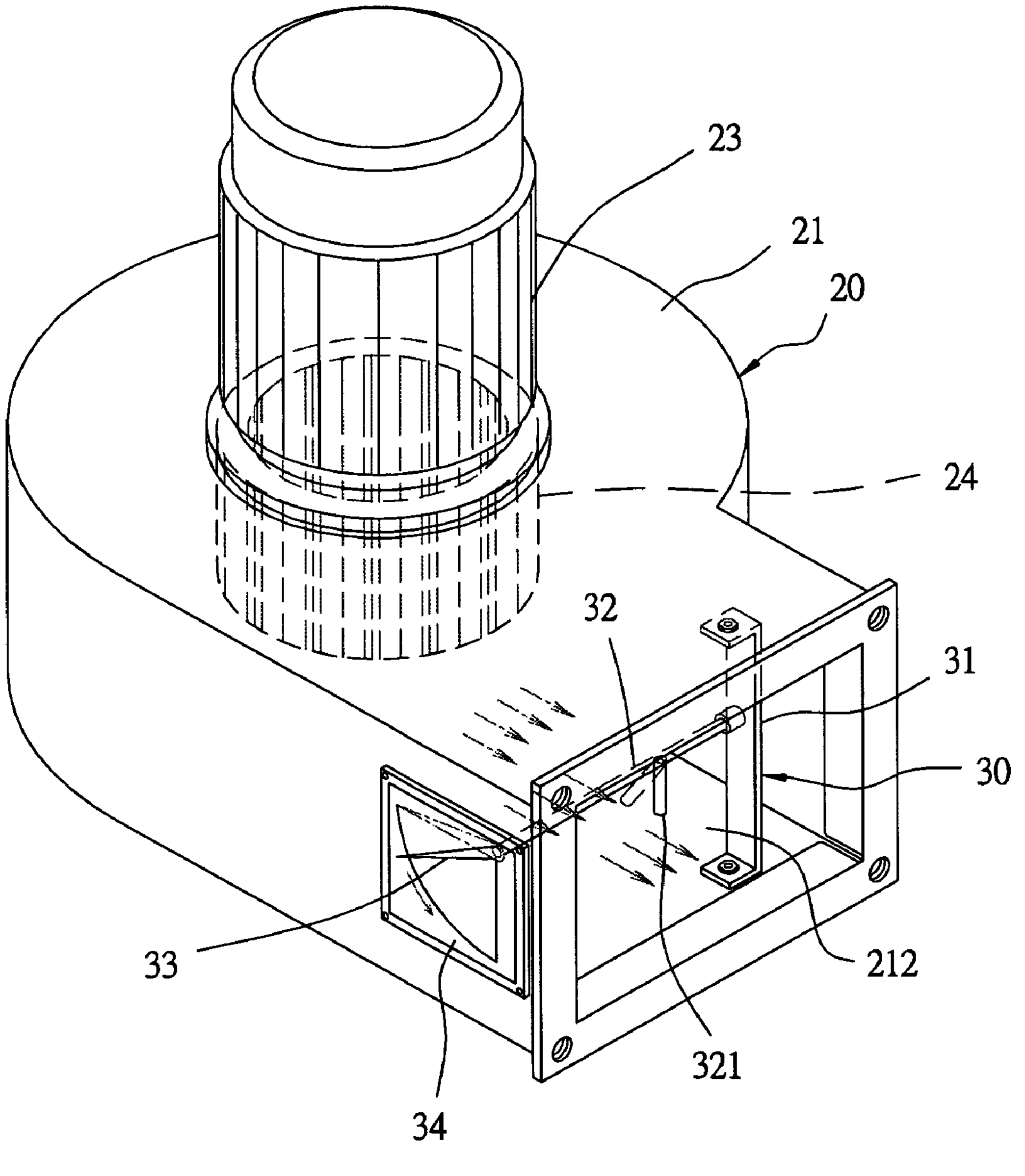
FIG. 4 is a perspective view of a wind indictor in the present invention, showing the wind moving direction; and, FIG. 5 is a side cross-sectional view of the dry spray device in the present invention, showing its filtering condition.

The wind force indicator 30, as shown in FIG. 4, has a sustain rod 31 vertically fixed in the wind housing 21 near the exhaust hole 212, a pivot member 32 provided between the sustain rod 31 and the left sidewall of the wind housing 20, a wind receiving rod 321 fixed vertically with an intermediate portion of the pivot member 32 and near the exhaust hole 212, an indicating needle 33 having its one end fixed with an outer end of the pivot member 32 exposing out the left sidewall of the housing 21 and an indicating faceplate 34 fixed on the left sidewall surface of the housing 21 under the indicating needle 33 so that the needle 33 may be rotated by the pivot member 32 to indicate the wind amount on the indicating faceplate 34 in case of the wind receiving rod blown by the wind exhausted out.

The first filter 40 is composed of a plurality of filter plates 41 made of active carbon filter nets and non-woven cloth layers, positioned vertically in the interior space 11 in front of the inlet 12 for filtering for the first stage.

The second filter 50 is composted of a plurality of filter plates 51 made of active carbon filter nets and non-woven cloth layers. The filter plates 51 have their bottom edges supported by the sustain bar 14 in the interior space 11 of the base 10, and the upper edges fixed at the upper edges of the inlet 12 and arranged to form a V-shape made up of a front row and a rear row so that the filter plates 51 are spaced apart equidistantly from the outlet 13 of the housing 10 to form the second filter stage.

The isolating device 60 consists of an upper isolating plate 61 and two side (the right and the left one) isolating plates 62, which are pivotally connected to the two sides of the inlet 12, and the upper isolating plate 61 is movably combined with pins with the top of the two side isolating plates 62. Then a spray space is formed between the upper and the two side isolating plates 61 and 62, with a cloth curtain (not shown) respectively covered on each of the isolating plates 61 and 62. Further, an elastic retainer 63 is respectively provided at the outer bottom of the two side isolating plates 62.

The work frame 70 has a worktable 71 for placing a work to be sprayed with paint, and the worktable 71 has its inner side pivotally connected to the base 10 a little below the inlet 12 to enable the worktable 71 to be swung down for collapsing. Further, The worktable 71 has a position hole 711 at the two sides of the front edge for the elastic retainers 63 to insert in for securing the worktable 71 with the two side isolating plates 62, and a foot 72 is foldably provided under two sides of the front edge of the worktable 71.

Figure 5:
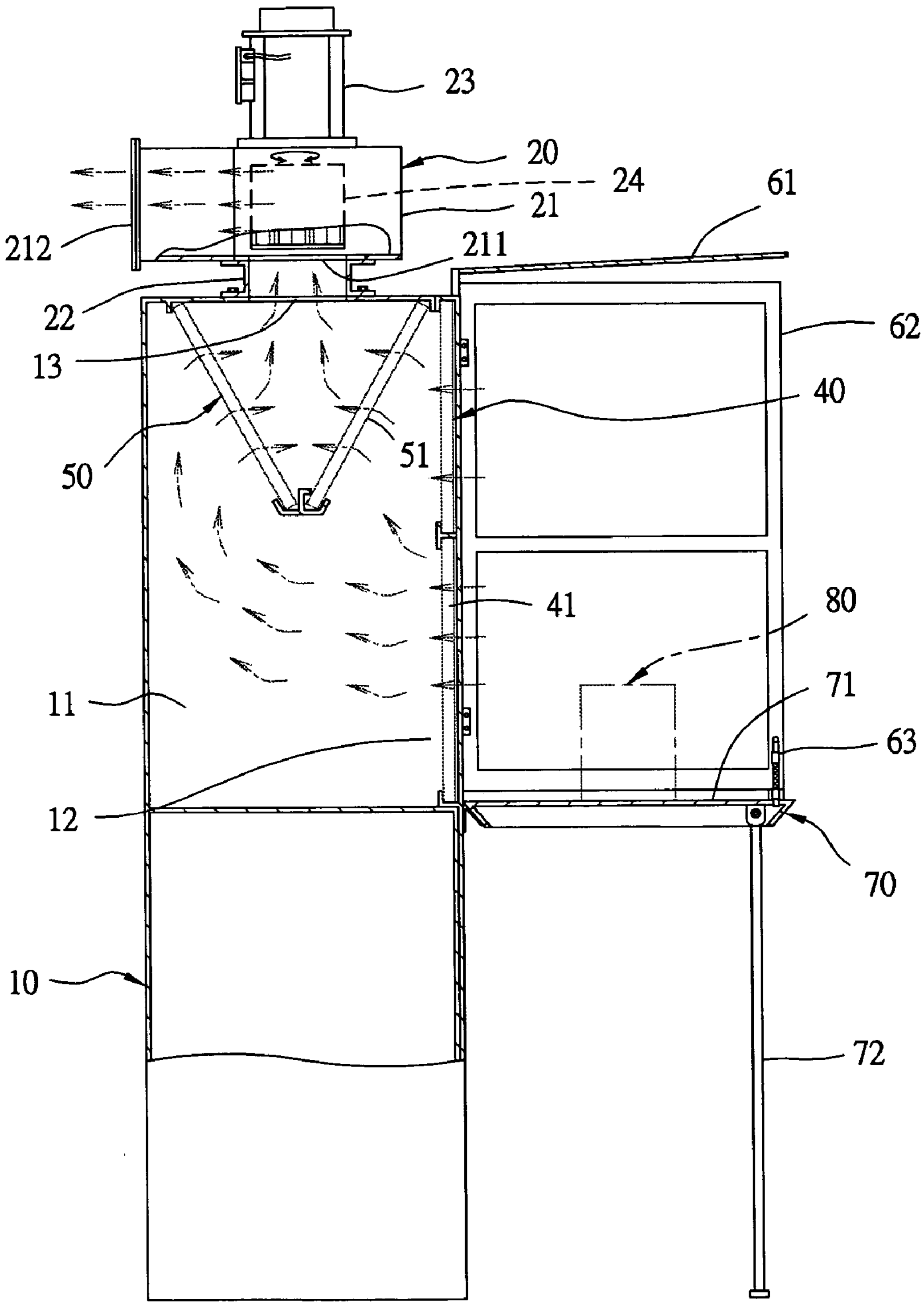

In using, referring to FIG. 5, a user places a work 80 to be sprayed with paint on the worktable 71 in the working space surrounded by the upper isolating plate 61 and the two side isolating plates 62. The motor 23 of the air extracting device is then started to move the rotary fan 24, permitting the inlet 12 of the housing 10 produce vacuum sucking force. Then spraying paint is to begin, and during spraying work, waste gas and paint odor produced in the working space is to be sucked through the inlet 12 and the filter plates 41 of the first filter 40 into the interior space 11. Then waste gas is filtered by the second filter 50 of the V-shape consisting of the front and the rear filters 51 and then out of the outlet 13 and into the wind housing 21 to become clean air exhausted out of the exhaust hole 212 into open air. Therefore, waste gas with paint odor is filtered completely not to pollute the environment and protect workers' health. And it is necessary to point out that the wind force indicator 30 on the air extracting device 20 will have its wind receiving rod 321 of the pivot member 32 blown to swing by the clean air exhausted out to force the pivot member 32 rotate for a certain angle so that the indicating needle 33 may be moved to swing on the indicting faceplate 34 when the motor 23 operates to let waste gas flow through the first and the second filter 41 and 51. Thus a user can watch the position of the needle 33 on the faceplate 34 and judge whether the air exhausting amount is proper or not. In case the exhausted amount is weak, far below it should be, with normal operation of the motor 23, then the user may be aware that the filers 41 and 51 may be clogged with dust or paint particles, and can take necessary measures to correct the abnormal conditions.

The dry spray device according to the invention has the following advantages, as can be understood from the foresaid description.

1. It does not pollute the environment but can protect workers' health, because it is provided with a good spraying space, in addition to two-stage filtering processes by the two filters 41 and 51, filtering waste gas and paint odor completely into clean air.

2. It does not occupy much space as the width of the base is short, with the large interior space 11 in the base 10 and with the V-shaped structure of the second filter 51 positioned under the air extracting device 20 and the short gap spacing the first filter and the second filter.

3. The front and the rear filter plates 51 are arranged in the V-shape to form a V-shaped passageway so that the front and the rear filter plates 51 receive balanced vacuum force to absorb dust or particles not concentrated on a special location, letting them have a long service life.

4. The isolating plates 61 and 62, the worktable 71 and the feet 72 are all collapsible, making this dry spray device compact and applicable even to a family factory.

5. The clogging conditions of the filters 41 and 51 can be judged by the indicating needle 33 of the wind force indicator 30, so they can be properly maintained, replaced or washed in due time.

While the preferred embodiment of the invention has been described above, it will be recognized and understood that various modifications may be made therein and the appended claims are intended to cover all such modifications that may fall within the spirit and scope of the invention.

What is claimed is:

1. A dry spray device comprising:

A base having an interior space formed in an upper portion, said interior space having its front side provided with an inlet, and an outlet formed in an upper side wall of said interior space and communicating with said interior space:

An air extracting device installed in an wind housing on said base, having a sucking hole and an exhaust hole, said sucking hole communicating with said outlet of said base, a motor provided on said wind housing for driving a rotary fan fixed in said wind housing for sucking in gas from said sucking hole and exhausting out of said exhaust hole:

A first filter composing of a plurality of filter plates, said filter plates secured vertically in said interior space in front of said inlet of said base for performing a first stage of filtering:

A second filter composing of a plurality of filter plates, said filter plates arranged in a V-shape at a front and a rear portion in said interior space of said base, all said filter plates located almost equidistantly spaced apart from said outlet of said base for performing a second stage of filtering:

An isolating device consisting of a plurality of isolating plates, said isolating plates surrounding a space outside of said inlet of said base and forming a spraying space:

A work frame having at least a worktable positioned outside of a lower end of said inlet of said base for placing a work to be sprayed with paint; and a wind force indicator is further provided on said air extracting device, having a sustaining rod vertically positioned in said wind housing near said exhaust hole, a pivot member fitted rotatably between said sustaining member and a left side wall of said wind housing, a wind receiving rod fixed vertically with an intermediate portion of said pivot member near said exhaust hole, a needle fixed with an outer end of said pivot member exposing out of the left sidewall of said wind housing, an indicating faceplate fixed on an outer surface of said left sidewall and located under said indicating needle so that said indicating needle can be moved by rotation of said pivot member to indicate the amount of the wind exhausted out in case of said wind receiving rod blown to swing by the wind exhausted out of said exhaust hole.

2. The dry spray device as claimed in claim 1, wherein said filer plates of said first and said second filter are made of active carbon nets and non-woven cloth layers.

3. The dry spray device as claimed in claim 1 wherein said two side isolating plates are respectively provided with an elastic retainer, and said worktable has a hole at two sides of the front edge, said elastic retainer inserts respectively in the holes of said worktable to secure said side isolating plates with said worktable.

4. The dry spray device as claimed in claim 1, wherein said sucking hole of said wind housing is located in the bottom and connected to said outlet of said base with a connect tube, said exhaust hole of said wind housing is located in a rear side, and said motor is fixed vertically on tope of said wind housing.

5. The dry spray device as claimed in claim 1, wherein said work frame has the rear side of its worktable pivotally connected horizontally to the front surface of said base and able to swing down for collapsing, and a sustain foot respectively provided collapsible under two sides of the front edge of said worktable.

* * * * *